(12) United States Patent
Ganesan et al.

(10) Patent No.: US 8,896,857 B2
(45) Date of Patent: Nov. 25, 2014

(54) CONTENT RECEIPT VIA EMAIL ADDRESSES

(75) Inventors: Kumaravel Ganesan, Dindigul TamilNadu (IN); Palanikumar Thangapandian, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 121 days.

(21) Appl. No.: 13/407,202

(22) Filed: Feb. 28, 2012

(65) Prior Publication Data

US 2013/0222843 A1    Aug. 29, 2013

(51) Int. Cl.
*G06F 3/12* (2006.01)
*G05B 19/00* (2006.01)
*G06F 7/00* (2006.01)
*G08B 29/00* (2006.01)
*H04L 9/32* (2006.01)

(52) U.S. Cl.
USPC ............ 358/1.14; 340/5.2; 340/5.6; 358/1.15

(58) Field of Classification Search
CPC ........................................................ G06F 3/12
USPC ................................. 358/1.1–1.9, 1.11–1.18
See application file for complete search history.

(56) References Cited

U.S. PATENT DOCUMENTS

| | | | |
|---|---|---|---|
| 5,974,547 A * | 10/1999 | Klimenko | 713/2 |
| 6,385,728 B1 * | 5/2002 | DeBry | 726/9 |
| 6,859,832 B1 | 2/2005 | Gecht et al. | |
| 7,428,578 B1 * | 9/2008 | Hull et al. | 709/206 |
| 2009/0009802 A1 * | 1/2009 | Shaw et al. | 358/1.15 |
| 2010/0302579 A1 | 12/2010 | Nuggehalli et al. | |
| 2011/0216349 A1 | 9/2011 | McCorkindale et al. | |

* cited by examiner

*Primary Examiner* — King Poon
*Assistant Examiner* — Ibrahim Siddo
(74) *Attorney, Agent, or Firm* — Garry Perry

(57) ABSTRACT

In one embodiment, first content is received, via an email address from which printable content is received from a plurality of computing devices, from a network-connected computing device. The first content is stored. An access code is sent to the publisher device. The code is received from a network-connected printer. The code is compared to a database or registry that associates the access code with the first content. The first content is caused to be rendered. The rendered first content is sent to the printer for printing.

20 Claims, 5 Drawing Sheets

| AccessCode/Content Registry ||| |
|---|---|---|
| Access Code | Content | Expiration Date |
| 46780A1 | Publisher1@abc.com/46780A1 | 12/08/2012 |
| 46780A2 | Publisher1@abc.com/46780A2 | 12/10/2012 |
| 70342A1 | Publisher2l@def.com/70342A1 | 12/11/2012 |
| 70342A2 | Publisher2l@def.com/70342A2 | 12/15/2012 |
| 70342A3 | Publisher2l@def.com/70342A3 | 12/16/2012 |
| 82831A1 | Publisher3@ghi.com/82831A1 | 12/09/2012 |
| 82831A2 | Publisher3@ghi.com/82831A2 | 12/14/2012 |

FIG. 4

CONTENT RECEIPT VIA EMAIL ADDRESSES

BACKGROUND

Some network-connected printers are capable of sending and receiving communications and printable content via the internet, without being connected to a desktop computer, laptop computer, or other host computing device. Such printers may also provide users with an option to download and execute, or to otherwise access at the printer, printer applications that facilitate content browsing, downloading, and printing of content that is available to the printer via the internet.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

FIG. 4 depicts an example access code/content registry, according to various embodiments.

The same part numbers designate the same or similar parts throughout the figures.

DETAILED DESCRIPTION OF EMBODIMENTS

Figure 1:
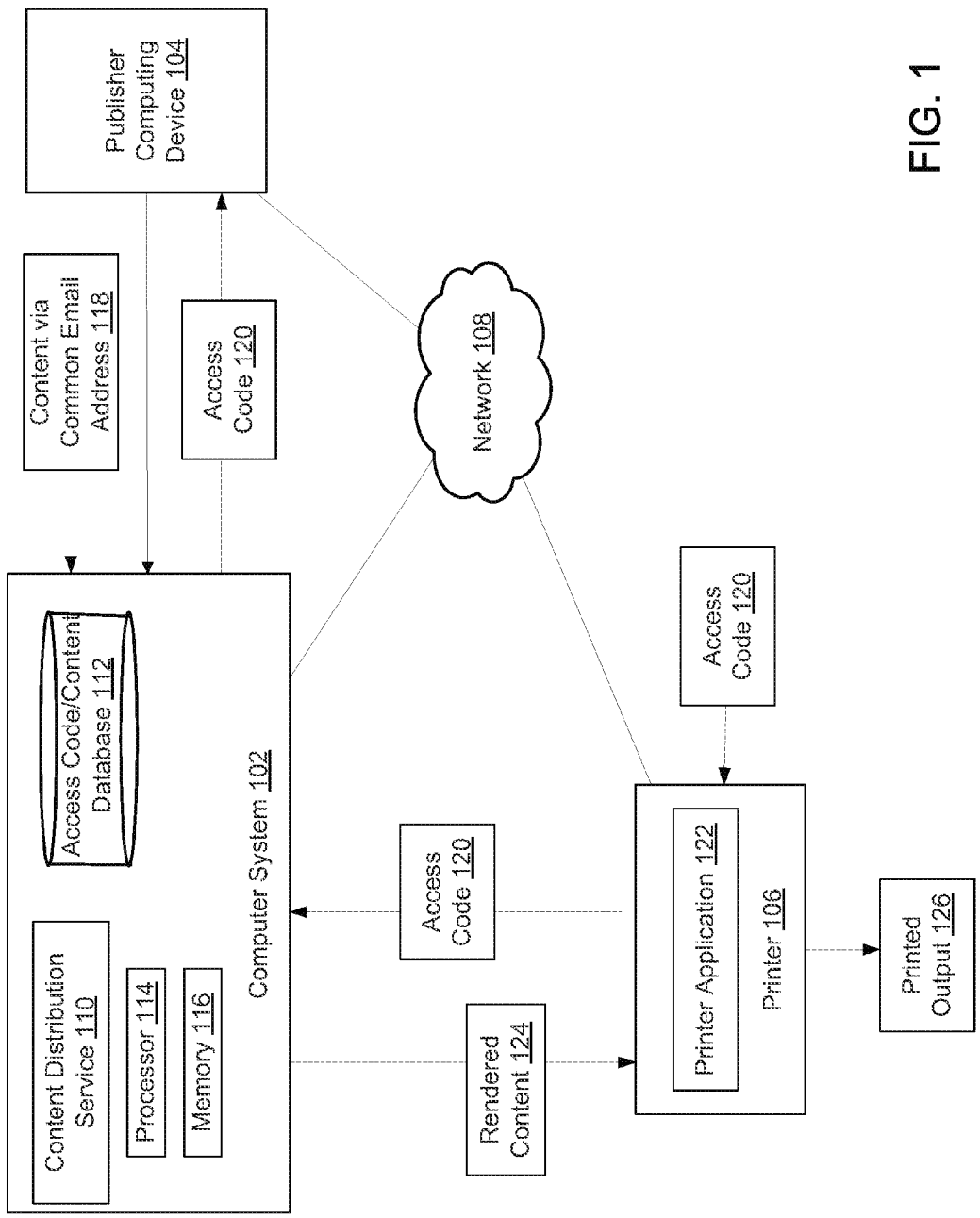
FIG. 1 is a block diagram illustrating a system according to various embodiments.

Internet-connected printers provide users with great advantages and flexibility to browse, download, edit, print, and/or share internet-accessible content at printer applications accessible at the printer. Examples of such printer applications include, but are not limited to, printer applications available at Hewlett Packard Company's "HP® ePrintCenter" web site that can provide printable content relating to business, calendars, coupons, education, entertainment, family activities, greeting cards, maps, news, photos, puzzles, recipes, tickets, and travel.

However, publishing entities have faced difficulties in making controlled mass distributions of printable content to users of internet-connected printers. Internet-connected printers typically have associated email addresses, and a controlled mass publishing entities such as coupon distribution agencies or marketing agencies have needed to be aware of a specific email address associated with a particular printer before sending printable content to that printer. In an example, a publishing entity may desire to distribute a promotional material that can be printed by anyone who has a web enabled printer. Using conventional methods, such distribution might require that the publishing entity know the email address of all the printers to which the materials will be made available.

Alternatively, the publishing entity might create a printer application specific to that publishing entity or the material to be distributed and arrange for that application to be hosted by a printer application hosting platform. Users of internet-connected printers could download the printer application from the hosting platform, and utilize the application to access the publishing entity's content. However, with this alternative successful distribution of content is dependent upon the users of the internet-connected printers finding and downloading the printer application. Further, each creation of a printer application by a publishing entity may require certain standards and compliance steps (e.g., printer application developer registration and/or printer application conformance processes) imposed by the hosting platform. Controlled mass distribution of content via the internet connected printers may be inhibited due to publishing entities viewing the printer application creation process as being too time consuming and/or expensive. This may particularly be the case if the amount of content to be distributed is small, or if the distribution is a seen as a one-time or infrequent event.

As used in this application, a "printer" or "printing device" refers to any liquid inkjet printer, toner-based printer, solid ink printer, or any other electronic device that prints. "Printer" or "printing device" includes any multifunctional electronic device that performs a function such as scanning and/or copying in addition to printing. A "network-connected printer" refers to a printer that is connected to a network, to be capable of obtaining content, sending and receiving messages, accessing network content, and/or accessing applications via a network. In examples, the network may be a proprietary network, a secured network, an open network, an intranet, an extranet, or an internet. "Printer application" refers to a software application that is accessible to a user at a network-connected printer and that enables retrieval of content, via the network, from computing devices external to the printer. "Content" refers to any text, image, or other information that can be received by a computer system for printing, and/or stored at the computer system for later printing. "Access code" refers to one or more alphanumeric or other characters that are entered or provided in some manner to initiate an event or get the use of something.

Accordingly, various embodiments described herein were developed to provide a method, a system, and a computer-readable medium containing instructions to enable a publishing entity to make a controlled mass distribution of printable content to users of internet connected printers without prior knowledge of the printers' email addresses, and without the requirement of creation of a printer application specific to the content. The disclosure allows for the sharing of a personal identification number ("PIN") or other access code with many printer users via traditional mediums, e.g., outside of internet communications, and enables automated retrieval of content by users of internet connected printers that have the access code. Further, the disclosure provides the flexibility to provide reusable access codes to publishers, or to generate unique access codes for each new instance of content. The disclosed embodiments are likely to lead to a better user experience for content publishers and to users of internet-connected printers and printer applications, resulting in increased user interaction with the publishers' content and increased usage of internet connected printers and printer applications. It should be noted that while the disclosure is discussed frequently with reference to internet-connected printers, the teachings of the present disclosure are not so limited and can be applied to any network-connected printer.

FIG. 1 shows a computer system 102 electronically connected to a publisher computing device 104 and a printer 106 via a network 108. Computer system 102 represents generally any computing device or group of computing devices configured to send and receive network requests, send and receive content, and otherwise communicate with, publisher device 104 and printer 106. In embodiments, computer system 102 may be or include a server, desktop computer, notebook computer, mobile device, tablet computer, and/or any other computing device. Publisher computing device 104 represents generally any computing device or group of computing devices configured to send and receive network requests, send content to, and otherwise communicate with, computer system 102.

Printer 106 represents generally a computing device that is operable to produce a printed print job or printed content, and additionally operable to send network requests, print jobs and other content to, receive network requests, print jobs, and other content from, and otherwise communicate with computer system 102 over network 108.

Network 108 represents generally hardware components and computers interconnected by communications channels that allow sharing of resources and information. Network 108 may include a cable, wireless, fiber optic, or remote connection via a telecommunication link, an infrared link, a radio frequency link, or some combination of these, or any other connectors or systems that provide electronic communication. Network 108 may include, at least in part, an intranet, the internet, or a combination of both. Network 108 may also include intermediate proxies, routers, switches, load balancers, and the like. The paths followed by network 108 between computer system 102, publisher device 104, and printer 106 as depicted in FIG. 1 represent the logical communication paths between these devices, not necessarily the physical paths between the devices.

Computer system 102 is shown to include content distribution service 110, access code/content database 112, processor 114, and memory 116. Content distribution service 110 represents generally any combination of hardware and programming configured to enable publishing entities to make mass distributions of printable content to users of internet connected printers without prior knowledge of the printers' email addresses and without the requirement of creating or distributing printer applications specific to the content. Access code/content database 112 represents generally a database that associates access codes and printable content. Processor 114 represents generally any instruction execution system, such as a computer/processor based system or an ASIC (Application Specific Integrated Circuit), a computer, or other system that can fetch or obtain instructions or logic stored in memory 116 and execute the instructions or logic contained therein. Memory 116 represents generally any memory configured to store program instructions and other data.

In the example of FIG. 1, content distribution service 110 executing at computer system 102 receives printable content 118 from publisher device 104 via network 108. Receipt at computer system 102 occurs via an email address through which computer system additionally receives printable content from a plurality of content publisher computing devices other than publisher device 104. Content mass distribution service 110 causes storage of the content 110 at a memory, such as memory 116, and sends an access code 120 to publisher device 104. In an example, the access code 120 may be a PIN. In another example, the access code 120 may be an alphanumeric code. In another example, the access code 120 may include characters other than alphanumeric characters.

A coupon provider or other publishing entity that desires to distribute content 118 makes a mass distribution of access code 120 via one or multiple communication mediums, including a distribution to a user of network connected printer 106. In an example, the distribution of access code 120 to users, including a user of network-connected printer 106, may be an electronic distribution, e.g. via an email address. In another example, distribution of the access code to users of network-connected printers, including a user of network-connected printer 106, may be via traditional mediums that do not require an email address or any other identifying information regarding the user of printer 106 or regarding printer 106. Examples of such traditional communication mediums include billboard signage, television or radio or print advertisements.

A user of network-connected printer 106 who receives access code 120 from the publishing entity, and who desires to receive content 118 utilizes a printer application 122 running at network-connected printer 106 to send access code 120 to content distribution computer system 102. In an example, the user initiates the sending of access code 120 to computer system 102 by entering access code 120 at printer 106 via a touchpad, keyboard, or other data entry device connected or incorporated within printer 106. In other examples, the user may initiate the sending of access code 120 to computer system 102 by audibly communicating access code 120 to printer 106. Printer 106 in turn sends the access code 120 to computer system 102 via network 108.

Upon computer system 102's receipt of access code 120 from network-connected printer 106, content distribution service 110 compares access code 120 to access code/content database 120 that associates distribution access codes with printable content. In this example, content distribution service 110 determines that access code 120 is associated with content 118 via the comparison, retrieves content 118 from memory 116, and then causes the retrieved content to be rendered to a rendered format compatible with printer 106. In an example, rendering the content may include utilizing vector digital instructions as to how the content is to be printed to create a high resolution raster or bitmap image of the content. The instructions may be expressed in a number of various languages and formats, including but not limited to HPGL/2 (Hewlett-Packard Graphics Language 2), PostScript, PDF (Portable Document Format), JPEG (Joint Photographic Experts Group standard), TIFF (Tagged Image File Format), PCL3 (Printer Command Language 3) and PCL 6 (Printer Command Language 6). In an example, the rendering may apply smoothing or interpolation algorithms to an input bitmap of the content to generate an output bitmap image. Following rendering of content 118, content distribution service 110 sends rendered content 124 to network-connected printer 106, via network 108, for printing. Printer 106 prints rendered content 124 upon a print media to create printed output 126.

The functions and operations described with respect to content distribution service 110 and computer system 102 may be implemented as a computer-readable storage medium containing instructions executed by a processor (e.g., processor 114) and stored in a memory (e.g., memory 116). In a given implementation, processor 114 may represent multiple processors, and memory 116 may represent multiple memories. Processor 114 represents generally any instruction execution system, such as a computer/processor based system or an ASIC (Application Specific Integrated Circuit), a computer, or other system that can fetch or obtain instructions or logic stored in memory 116 and execute the instructions or logic contained therein. Memory 116 represents generally any memory configured to store program instructions and other data.

Figure 2:
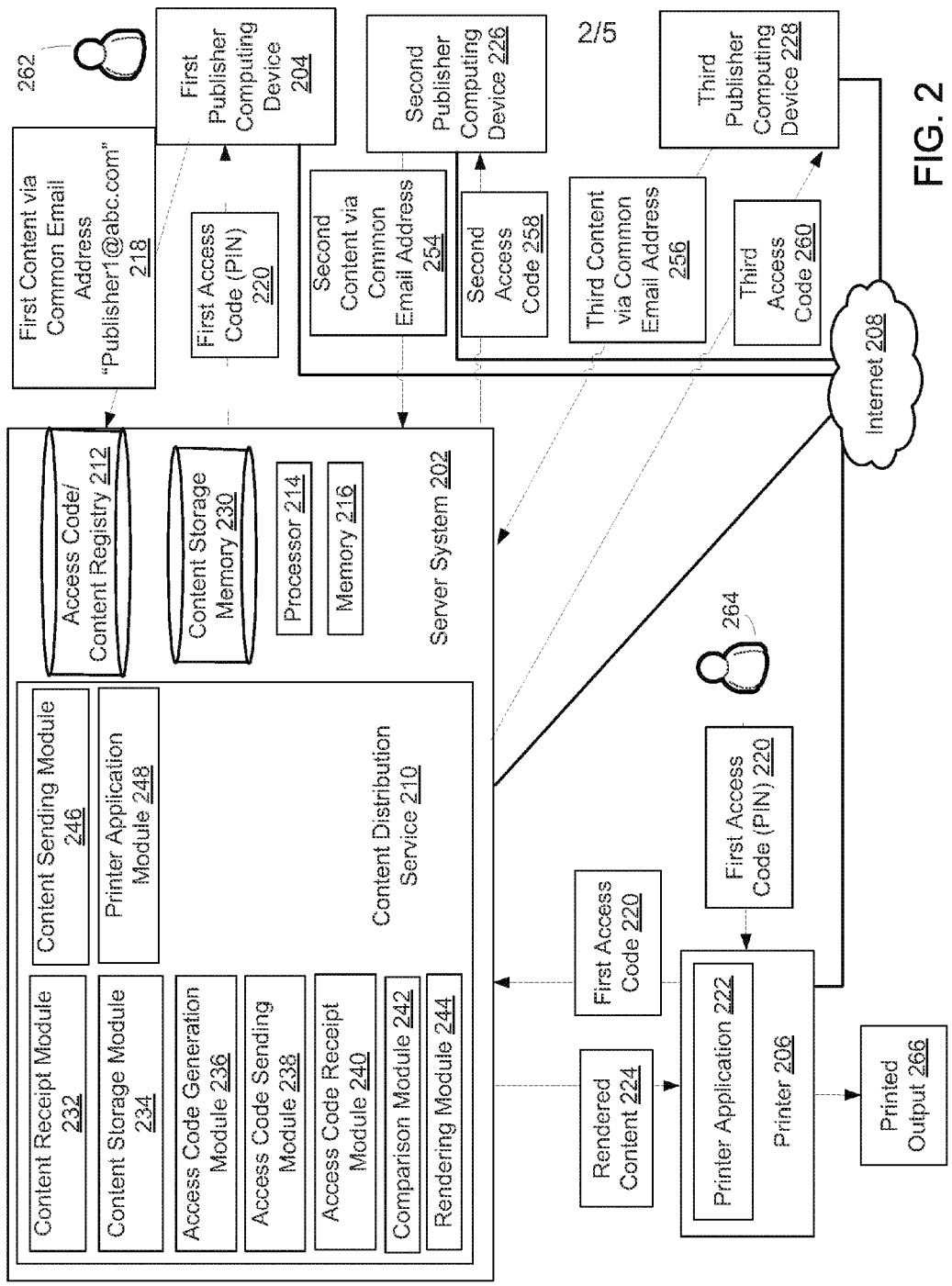
FIG. 2 is a block diagram illustrating a system according to various embodiments.

FIG. 2 is a block diagram illustrating a system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc.

described herein may be implemented as one or more software modules, hardware modules, special purpose hardware (e.g., application specific hardware, application specific integrated circuits (ASICs), embedded controllers, hardwired circuitry, etc.), or some combination of these.

FIG. 2 shows a server system 202 electronically connected to a first publisher computing device 204, second publisher computing device 226, third publisher computing device 228, and a printer 206 via an internet 208. Server system 202 represents generally any computing device or group of computing devices configured to send and receive network requests, send and receive content, and otherwise communicate with, first publisher device 204, second publisher computing device 226, third publisher computing device 228, and printer 206. In embodiments, server system 202 may be or include a server, desktop computer, notebook computer, mobile device, tablet computer, and/or any other computing device. First publisher computing device 204, second publisher computing device 226, and third publisher computing device 228 represent generally computing devices, or groups of computing devices, configured to send and receive network requests, send content to, and otherwise communicate with, server system 202. Printer 206 represents generally a computing device that is operable to produce a printed print job or printed content, and additionally operable to send network requests, print jobs and other content to, receive network requests, print jobs, and other content from, and otherwise communicate with server system 202 over internet 208.

Internet 208 represents generally hardware components and computers interconnected by communications channels that allow sharing of resources and information over an internet or intranet network, or over a combination of both. Internet 208 may include a cable, wireless, fiber optic, or remote connection via a telecommunication link, an infrared link, a radio frequency link, or some combination of these, or any other connectors or systems that provide electronic communication. Internet 208 may also include intermediate proxies, routers, switches, load balancers, and the like. The paths followed by internet 208 between server system 202, first publisher device 204, and printer 206 as depicted in FIG. 1 represent the logical communication paths between these devices, not necessarily the physical paths between the devices.

Server system 202 is shown to include content distribution service 210, access code/content registry 212, content storage memory 230, processor 214, and memory 216. Content distribution service 210 represents generally any combination of hardware and programming configured to enable publishing entities to make mass distributions of printable content to users of internet connected printers. Content distribution service 210 includes a content receipt module 232, content storage module 234, access code generation module 236, access sending module 238, access code receipt module 240, comparison module 242, rendering module 244, content sending module 246, and printer application module 248. Access code/content registry 212 represents generally a registry, database, lookup table or list that associates access codes and printable content. Content storage memory 230 represents generally a storage device or memory location at which printable content may be stored. Processor 214 represents generally any instruction execution system, such as a computer/processor based system or an ASIC (Application Specific Integrated Circuit), a computer, or other system that can fetch or obtain instructions or logic stored in memory 216 and execute the instructions or logic contained therein. Memory 216 represents generally any memory configured to store program instructions and other data.

In the example of FIG. 1, content receipt module 232 included within distribution service 210 and executing at server system 202 receives printable first content 218 from publisher device 204 via internet 208. Receipt of first content 218 at server system 202 occurs via an email address "Publisher1@abc.com" through which server system 202 additionally receives printable content from a plurality of content publisher computing devices other than first publisher device 204, including second publisher computing device 226 and third publisher computing device 228. In this example, server system 202, at other times or contemporaneously with the receipt of first content 218 from first publisher device 204, receives second content 254 from second publisher computing device 226 and third content 256 from third publisher computing device 228.

In an embodiment, content receipt module 232 identifies a format of the received first content 218, and compares the identified format to a database, registry, or list of acceptable content formats. In this embodiment, responsive to a determination that the identified format for first content 218 is an acceptable format, content receipt module 232 causes a communication to be sent to first publisher computing device 204. The communication acknowledges server system 202's receipt of the first content 218. Sending of first access code 220 to users of internet-connected printers proceeds as described in the paragraphs below. However, in an embodiment, if the identified format is determined to be in a format that is not acceptable to content distribution service 210, the mass distribution operation terminates and content receipt module 232 causes a communication to be sent to first publisher computing device 204 stating that received first content 218 is in an unacceptable format.

Content storage module 234 stores received first content 218 at a memory, such as content storage memory 230. In another example, first content 218 may be stored at a memory location located external to server system 202.

Access code generation module 236 generates a first access code 220 that is associated with first content 218. In an example, first access code 220 is a PIN that is unique to the first content. In embodiments, the PIN first access code 220 may be utilized by server system 202 to identify first content 218, in retrieving first content 218 from memory 216, and/or to restrict access to first content 218. In one example, first access code 220 that is generated is associated with an expiration time, such that after expiration of a time or the reaching of an expiration time first access code 220 is no longer functional. In another example, rather than first access code 220 being generated by access code generation module 236, first access code 220 is a code that already exists, and the code is assigned to first content 218.

In the example of FIG. 2, access code sending module 238 sends first access code 220 to first publisher device 204 via an email communication to first publisher computing device 204. In embodiments, the email address used to communicate first access code 220 to first publisher computer device 204 is a different email address than the "Publisher1@abc.com" common email address that server system 202 utilizes for receiving content from the first, second, and third publisher computing devices 204, 226, and 228. In this example, server system 202, at other times or contemporaneously with the sending of first access code 220, also sends a unique second access code 258 to second publisher computing device 226 to be associated with second content 254, and a unique third access code 260 to third publisher computing device 228 to be associated with third content 256. In an embodiment, access code sending module 238 sends an expiration time for the first access code 220 to the first publisher computing device 204 along with first access code 220. In an embodiment, access code sending module 238 sends to first publisher computing device 204, along with first access code 220, an access web address, such that a publishing entity 262 utilizing first publisher computing device 204 might forward the access web address to potentially interested users of internet connected printers.

Publishing entity 262 makes a mass distribution of the first access code 220 via one or multiple communication mediums, including a distribution to a user 264 of network connected printer 206. In an example, the mass distribution of the access code may also include distribution of the access web address at which an internet-connected printer can submit the first access code 220 to retrieve first content 218. In an example, the mass distribution of the first access code 220 and/or the access address could occur, via the network (e.g., via an email sent to known email addresses of users of internet-connected printers that have consented to such distribution). In another example, the mass distribution of the first access code 220 and/or the access address could occur, by other means other than via internet 208, such as word of mouth, signage, television or radio advertising, etc.

A user 264 of network-connected printer 206 who receives first access code 220 from publishing entity 262, and who desires to receive first content 218, utilizes a printer application 222 running at network-connected printer 206 to send first access code 220 to server system 202. In an example, printer application 222 may be a printer application that user 264 downloads to printer 206 via internet 208. In an example, user 264 in downloading printer application 222 utilizes an access web address that user 264 received with the first access code 220 as part of the mass distribution of the access code to potentially interested users of internet-connected printers. In an embodiment, printer application module 248 at server system 202 sends the printer application 222 to printer 206 via network 208.

Figure 3:
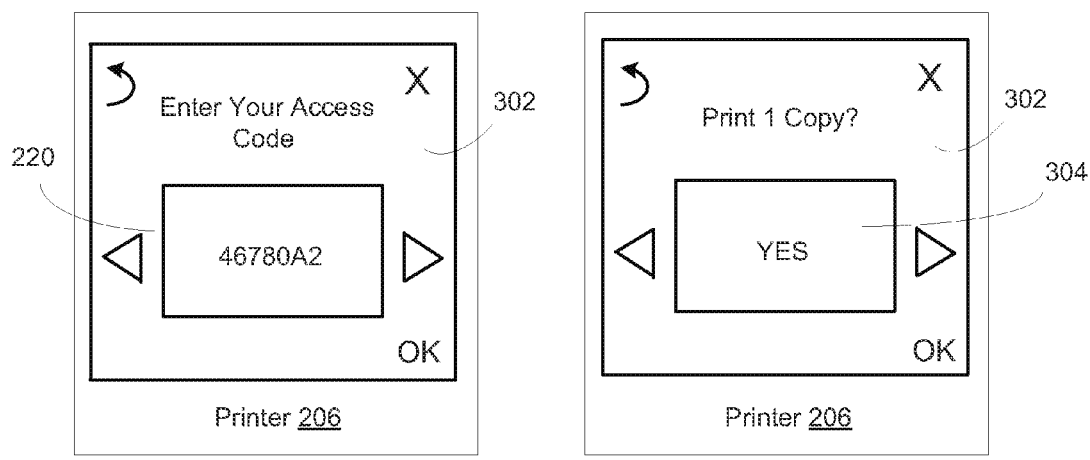
FIG. 3 is an example screen shot illustrating entering of an access code and a print instruction at an internet-connected printer, according to various embodiments.

FIG. 3 is a screen shot that provides an example entering of an access code and a print instruction at an internet-connected printer, according to various embodiments. In the example of FIG. 3, in view of FIG. 2, user 264 initiates the sending of first access code 220 to server system 202 by entering first access code 220 at printer 206 via a touchpad 302, keyboard, or other data entry device connected or incorporated within printer 206. In the example of FIG. 3, user 264 at this time additionally enters a print request 304 at the touchpad 302 requesting printing of one copy of first content 218 at printer 206. Returning to FIG. 2, Printer 206 in turn sends the first access code 220 to server system 202 via internet 208.

Upon server system 202's receipt of first access code 220 at the server system 202 from network-connected printer 206, access code receipt module 240 compares first access code 220 to access code/content registry 220 that associates distribution access codes with printable content.

FIG. 4, in view of FIG. 2, depicts an example of an access code/content registry 212 according to various embodiments. In this example, the access code/content registry 212 holds a set of access code/printable content associations, including the association of "46780A2" first access code 220 that was generated and sent to first publisher computing device 204 in connection with first content 218. Registry 212 also holds access code/printable content associations for other content 402 previously received from first publisher computing device 204, for second content 254 received via the common email address from second publisher computing device 226, and for the third content 256 received from third publisher computing device 228, all received via the "Publisher1@abc.com" common email address. In this embodiment, the registry 212 additionally associates expiration dates 404 for the access codes.

Returning to FIG. 2, comparison module 242 determines that first access code 220 is associated with first content 218 and determines that first access code 220 has not expired. Responsive to these determinations, first content 218 is retrieved from memory 216, and rendering module 242 causes the retrieved first content 218 to be rendered to a rendered format compatible with printer 206 and content sending module 246 sends rendered content 224 to network-connected printer 206, via internet 208, for printing. In one embodiment, responsive to these determinations content sending module 246 additionally sends to printer 206 a set of available options for printer settings that are consistent with the first content. Printer 206 prints rendered content 224 upon a print media to create printed output 266.

The functions and operations described with respect to content distribution service 210 and server system 202 may be implemented as a computer-readable storage medium containing instructions executed by a processor (e.g., processor 214) and stored in a memory (e.g., memory 216). In a given implementation, processor 214 may represent multiple processors, and memory 216 may represent multiple memories. Processor 214 represents generally any instruction execution system, such as a computer/processor based system or an ASIC (Application Specific Integrated Circuit), a computer, or other system that can fetch or obtain instructions or logic stored in memory 216 and execute the instructions or logic contained therein. Memory 216 represents generally any memory configured to store program instructions and other data.

Figure 5:
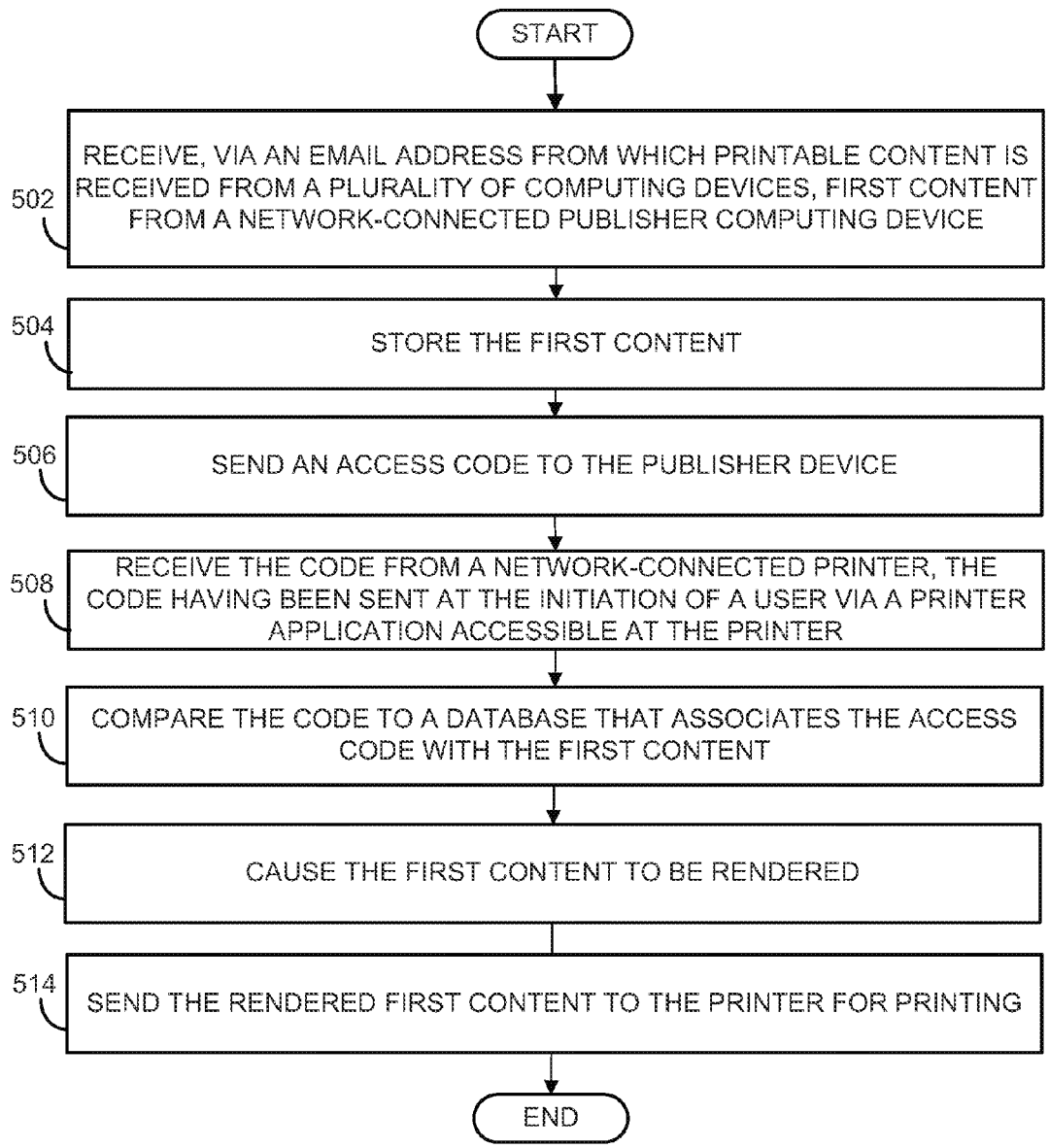
FIG. 5 is a flow diagram depicting steps taken to implement various embodiments.

FIG. 5 is a flow diagram of operation in a system according to various embodiments. In discussing FIG. 5, reference may be made to the diagram of FIGS. 1 and 2 to provide contextual examples. Implementation, however, is not limited to those examples. Starting with FIG. 5, first content is received from a network-connected publisher computing device via an email address from which printable content is received from a plurality of computing devices (block 502). Referring back to FIG. 2, content receipt module 232 may be responsible for implementing block 502.

Continuing with FIG. 5, the first content is stored (block 504). Referring back to FIG. 2, content storage module 234 may be responsible for implementing block 504.

Continuing with FIG. 5, an access code is sent to the publisher device (block 506). Referring back to FIG. 2, access code sending module 238 may be responsible for implementing block 506.

Continuing with FIG. 5, the code is received from a network-connected printer, the code having been sent at the initiation of a user via a printer application accessible at the printer (block 508). Referring back to FIG. 2, access code receipt module 240 may be responsible for implementing block 508.

Continuing with FIG. 5, the code is compared to a database that associates the access code with the first content (block 510). Referring back to FIG. 2, comparison module 242 may be responsible for implementing block 510.

Continuing with FIG. 5, the first content is caused to be rendered (block 512). Referring back to FIG. 2, rendering module 244 may be responsible for implementing block 512.

Continuing with FIG. 5, the rendered first content is sent to the printer for printing (block 514). Referring back to FIG. 2, content sending module 246 may be responsible for implementing block 514.

Various modifications may be made to the disclosed embodiments and implementations without departing from their scope. Therefore, the illustrations and examples herein should be construed in an illustrative, and not a restrictive, sense.

What is claimed is:

1. A non-transitory computer-readable storage medium containing instructions, the instructions when executed by a processor to cause the processor to:

receive, via an email address from which printable content is received from a plurality of computing devices, first content from a network-connected publisher computing device;

store the first content;

send an access code to the publisher device;

receive the code from a network-connected printer, the code having been sent at initiation of a user via a printer application accessible at the printer;

compare the code to a database that associates the code with the first content;

cause rendering of the first content; and send the rendered first content to the printer for printing.

2. The medium of claim 1, wherein the network is an internet or an intranet.

3. The medium of claim 1, wherein the instructions cause the processor to identify a format of the first content and compare the identified format to a registry of acceptable formats, and wherein the storage of the first content and the sending of the access code is responsive to the determination.

4. The medium of claim 1, wherein the access code is sent to the publisher device via email communication.

5. The medium of claim 1, wherein the instructions cause the processor to generate the access code.

6. The medium of claim 1, wherein the access code is unique to the first content.

7. The medium of claim 1, wherein the instructions cause the processor to send an access web address to the publisher device.

8. The medium of claim 1, wherein the instructions cause the processor to send an acknowledgement of receipt of the first content to the publisher device.

9. The medium of claim 1, wherein the instructions cause the processor to send an expiration time to the publisher device, and the rendering of the first content and the sending of the rendered first content are responsive to determining that the received access code has not expired.

10. The medium of claim 1, wherein the instructions cause the processor to make the printer application available to the printer via the network.

11. The medium of claim 1, wherein the instructions cause the processor to send to the printer options for printer settings consistent with the first content.

12. A system, comprising:

a content receipt module, configured to receive first content, via an email address from which printable content is received from a plurality of computing devices, from a network-connected computing device;

a content storage module, configured to cause storage of the first content;

an access code sending module, configured to send an access code to the publisher device;

an access code receipt module, configured to receive the code from a network-connected printer, the code having been sent as the result of user interaction with a printer application accessible at the printer;

a comparison module, configured to compare the code to a registry that associates the access code with the first content;

a rendering module, configured to cause rendering of the first content; and a content sending module, configured to send the rendered first content to the printer for printing.

13. The system of claim 12, wherein the network is an in met or an intranet.

14. The system of claim 12, wherein the access code is sent to the publisher device via email communication.

15. The system of claim 12, further comprising an access code generation module, configured to cause the processor to generate the access code.

16. The system of claim 12, wherein the access code is unique to the first content.

17. The system of claim 12, wherein the access code sending module is configured to send an access web address to the publisher device.

18. The system of claim 12, wherein the access code sending module is configured to send an expiration time to the publisher device, and wherein the rendering of the first content and the sending of the rendered first content are responsive to determining that the received access code has not expired.

19. The system of claim 12, further comprising a printer application module, configured to make the printer application available to the printer via the network.

20. A non-transitory computer-readable storage medium containing instructions, the instructions when executed by a processor to cause the processor to:

receive, via an email address from which printable content is received from a plurality of computing devices, first content from an internet-connected publisher computing device;

store the first content;

generate an access code for retrieval of the first content;

send the access code and an expiration time to the publisher device via an email communication;

receive the code from an internet-connected printer, the code having been sent at the initiation of a user via a printer application accessible at the printer;

determine the code has not expired;

compare the code to a database that associates the access code with the first content;

cause rendering of the first content; and send the rendered first content to the printer for printing.

* * * * *